United States Patent [19]

Grüning et al.

[11] Patent Number: 4,537,595
[45] Date of Patent: Aug. 27, 1985

[54] ORGANOPOLYSILOXANES WITH BUNTE SALT GROUPS, THEIR SYNTHESIS AND USE FOR THE SURFACE TREATMENT OF INORGANIC OR ORGANIC MATERIALS

[75] Inventors: Burghard Grüning; Ulrich Holtschmidt; Götz Koerner, all of Essen, Fed. Rep. of Germany

[73] Assignee: TH. Goldschmidt AG, Essen, Fed. Rep. of Germany

[21] Appl. No.: 625,711

[22] Filed: Jun. 28, 1984

[30] Foreign Application Priority Data

Jul. 2, 1983 [DE] Fed. Rep. of Germany ....... 3323881

[51] Int. Cl.³ ............ D06M 3/06; D06M 13/26; C07F 7/08; D21F 11/14
[52] U.S. Cl. .................... 8/115.6; 8/127.5; 8/127.6; 8/128 R; 8/128 A; 162/135; 162/164.4; 252/8.6; 252/8.9; 427/288; 427/387; 427/389; 427/411; 427/412; 427/427; 428/447; 210/506; 210/508; 210/509; 528/10; 528/30; 528/33; 528/40; 556/428; 556/444; 556/445; 556/446
[58] Field of Search ............. 8/127.5, 127.6, 115.6, 8/128 R, 128 A, DIG. 1; 162/135, 164.4; 427/288, 387, 389, 411, 412, 427; 428/447; 210/506, 508, 509; 556/428, 444, 445, 446; 528/10, 30, 33, 40; 252/8.6, 8.9

[56] References Cited

U.S. PATENT DOCUMENTS

| | | | |
|---|---|---|---|
| 3,933,421 | 1/1976 | Lewis | 8/128 R |
| 4,101,272 | 7/1978 | Guise et al. | 8/128 A |
| 4,133,939 | 1/1979 | Bokerman et al. | 428/447 |
| 4,182,682 | 1/1980 | Koerner et al. | 8/115.6 |
| 4,208,312 | 6/1980 | Okada et al. | 528/33 |
| 4,225,312 | 9/1980 | Lewis et al. | 8/115.6 |
| 4,248,590 | 2/1981 | Koerner et al. | 252/8.6 |
| 4,248,596 | 2/1981 | Schafer | 8/127.6 |
| 4,406,738 | 9/1983 | Fink et al. | 428/447 |
| 4,436,521 | 3/1984 | Annen et al. | 8/606 |
| 4,448,817 | 5/1984 | Benisek | 427/389 |

OTHER PUBLICATIONS

C.A. 78-112601 (18), Lewis (1973), Ins. Tech. Cent.
C.A. 76-87067 (16), Wolfram (1971), Gillette Co. Res. Instit.
C.A. 94-210207 (26), Blackburn et al. (1980), G.B. 2040319.
C.A. 90-24666 (4), Cockett et al. (1978), Int. Wool Secr. Ilkley.

Primary Examiner—Herbert J. Lilling
Attorney, Agent, or Firm—Toren, McGeady, Stanger, Goldberg & Kiel

[57] ABSTRACT

Organopolysiloxanes with Bunte salt groups having the formula

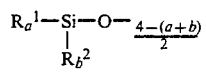

I the Bunte salt groups being linked to a silicon atom by way of a carbon atom and in which $R^1$ is methyl with the proviso that up to 10% of the $R^1$ groups may be alkyl with up to 18 carbon atoms or vinyl phenyl, hydrogen or hydroxyl, $R^2$ is the

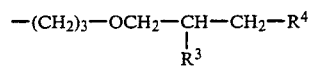

group or the

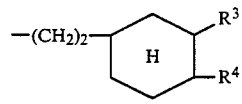

group, in which one of the $R^3$, $R^4$ groups represents an OH group and the other an —$S_2O_3$Me group (Me=alkali or the optionally substituted ammonium group), whereby the $R^3$ and $R^4$ radicals can be hydroxyl or together the oxygen of an oxirane ring in an amount up to 50% of the $R^2$ group, a has any value from 1 to 2.33 and b has any value from 0.02 to 1.

The compounds can be synthesized from the corresponding organopolysiloxanes having epoxy groups by reaction with alkali or ammonium thiosulfate and used for the surface treatment of inorganic or organic materials, for example, textiles, paper or rock wool.

15 Claims, No Drawings

ORGANOPOLYSILOXANES WITH BUNTE SALT GROUPS, THEIR SYNTHESIS AND USE FOR THE SURFACE TREATMENT OF INORGANIC OR ORGANIC MATERIALS

BACKGROUND OF THE INVENTION

1. Field of the Invention

The invention relates to organopolysiloxanes with Bunte salt groups linked to a silicon atom by way of carbon atoms, the synthesis of these compounds and their use for the surface treatment of inorganic or organic materials. Such compounds are especially useful in the textile industry for the treatment of fibers, yarns, woven and knitted materials or other textile fabrics in order to influence their surface properties, such as, for example, their lubricity, hand, or shrinkage properties, or to impregnate paper or slag wool.

2. Description of the Prior Art

Bunte salts are generally understood to be alkali-S-alkyl or alkali-S-aryl thiosulfates. As used herein, the concept of a Bunte salt group includes the alkali or ammonium salts of the $-S_2O_3^{\ominus}$ group which is linked to a carbon atom.

Bunte salts are hydrolized by aqueous acids with the formation of thiols. In alkaline medium they form the corresponding disulfides as well as other products. This reactivity is utilized for fixing dyes with Bunte salt groups on textile materials. The functional groups of the fibers, such as, the OH group of the celluloses, the amino and thiol groups of wool, or the acid amide groups of synthetic polyamides, act in this reaction as nucleophilic agents. After pretreatment of cellulose with sodium sulfide solution or during the treatment of wool, polycondensation takes place on the substrate with the formation of disulfide bridges. A corresponding dyeing with Bunte salt dyes is therefore washfast. Processes for synthesizing compounds with Bunte salt groups, the properties of these compounds and their use are described in "Angewandte Chemie" 79 (1967), page 520 ff.

The "Textile Research Journal" 62 (1982) page 580 ff. discloses the use of polyethers containing Bunte salt groups, for increasing shrinkproofness.

Organosilicon compounds with Bunte salt groups are described only in the form of the monomeric silanes. The reaction of chloromethyl or γ-chloropropyltrimethylsilanes with aminoethanethiosulfuric acid is known from the "J. Heterocyclic Chemistry" 5 (1968) 115. The reaction between ethylene imine, ammonium thiosulfate and trimethylvinylsilane in which a compound of the formula

(CH₃)₃SiCH₂CH₂NHCH₂CH₂S₂O₃NH₄ is formed has also already been described.

However, prior to the present invention, organopolysiloxanes with Bunte salt groups have not been known. Also, it was assumed that their synthesis would create difficulties since the usual synthesis processes for Bunte salts depend on the reaction of reactive compounds with alkali thiosulfate in a polar medium, in which the organopolysiloxanes are insoluble or only slightly soluble. Moreover, it is reported in "Angewandte Chemie" 79, (1967) p. 520 ff, that 1,2-epoxyalkanes generally react with sodium thiosulfate with ring splitting and formation of derivatives of 2-hydroxyethanesulfonic acid.

SUMMARY OF THE INVENTION

We have discovered new organopolysiloxane compounds having Bunte salt groups and having the formula

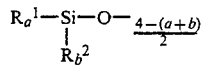

the Bunte salt groups being linked to a silicon atom by way of a carbon atom and in which $R^1$ is methyl with the proviso that up to 10% of the $R^1$ groups may be alkyl with up to 18 carbon atoms or vinyl phenyl, hydrogen or hydroxyl, $R^2$ is the

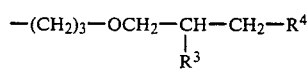

group or the

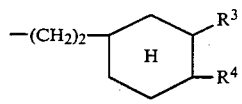

group in which one of the $R^3$, $R^4$ groups represents an OH group and the other an $-S_2O_3Me$ group (Me=alkali or the optionally substituted ammonium group), whereby however the $R^3$ and $R^4$ radicals can be hydroxyl or together the oxygen of an oxirane ring in an amount up to 50% of the $R^2$ radicals, a has any value from 1 to 2.33 and b has any value from 0.02 to 1.

The organopolysiloxanes of formula I may be linear or branched, a being determined by the number of Bunte salt groups, by the degree of branching, as well as by the chain length.

DESCRIPTION OF THE PREFERRED EMBODIMENTS

Preferred are organopolysiloxanes in which $R^1$ is methyl. Up to 10% of the $R^1$ radicals may be alkyl with up to 18 carbon atoms, or vinyl, phenyl, hydrogen or hydroxyl groups. As alkyl groups with up to 18 carbon atoms, alkyl derived from the corresponding fatty acids is especially preferred.

The $R^3$ or $R^4$ group represents the Bunte salt group, the other group in each case representing a hydroxyl group, that is, if the $R^3$ group is the Bunte salt group, $R^4$ is a hydroxyl group and vice versa, if $R^4$ is a Bunte salt group, $R^3$ is a hydroxyl group. It is however possible that with only partial conversion, $R^3$ and $R^4$ partially, namely up to 50% of the $R^2$ groups, represent the oxygen radical of an oxirane ring, or if the oxirane ring is hydrolyzed, hydroxyl groups.

Within the Bunte salt group, the Me cation is alkali or ammonium, the latter optionally being substituted. Examples of substituted ammonium are tetrabutylammonium, tetramethylammonium or didecyldimethylammonium. Examples of inventive organopolysiloxanes are compounds of the following formulas

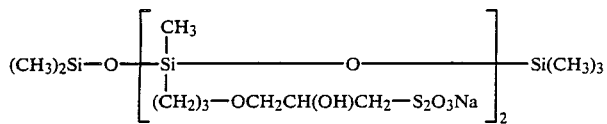
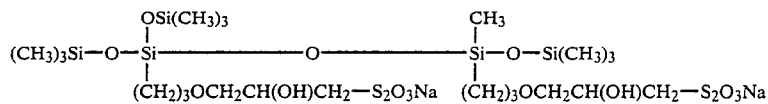
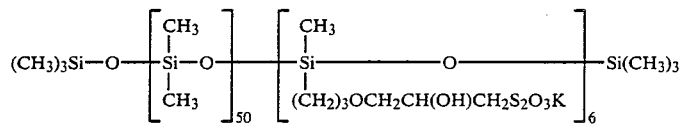
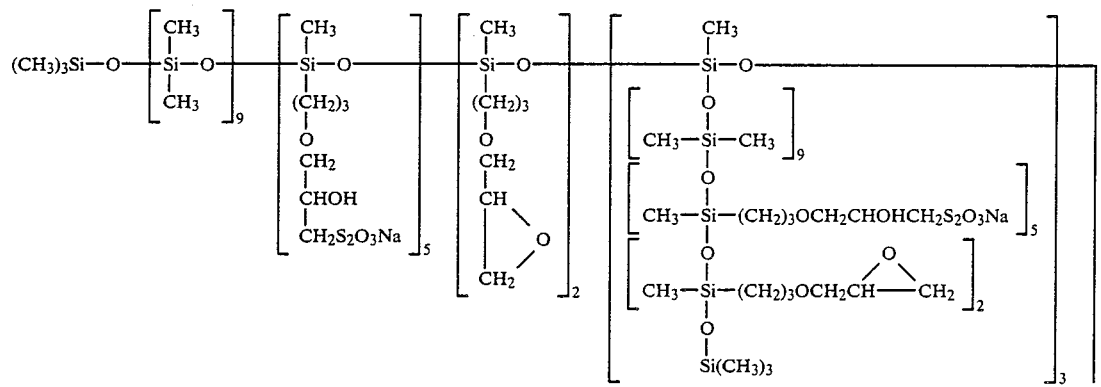
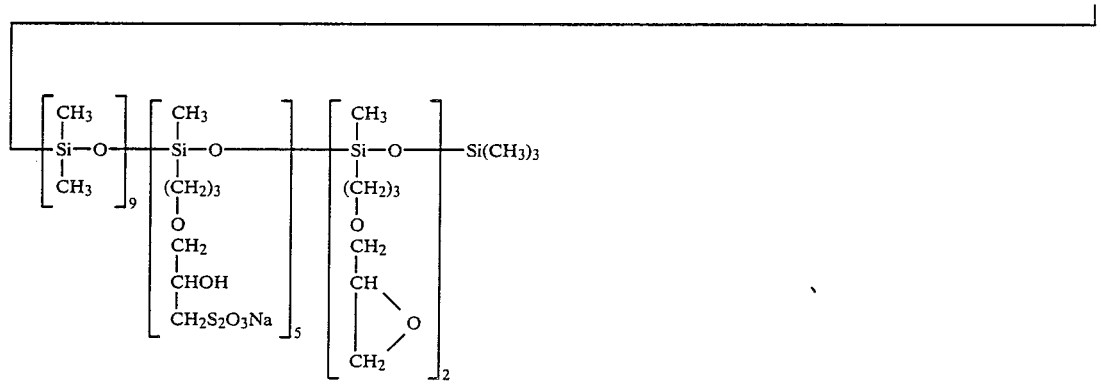
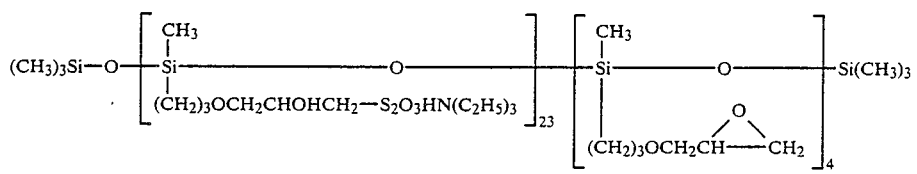
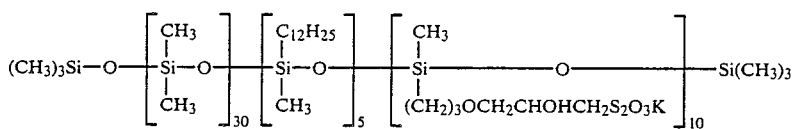

-continued

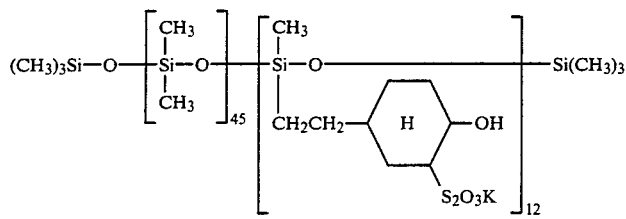

Corresponding to a further object of the invention, the inventive compounds are synthesized by reacting up to temperatures of 100° C. organopolysiloxanes which contain epoxy groups and have the following formula C. Catalysts may be added to the reaction mixture in order to accelerate the reaction. Particularly suitable catalysts are the phase transfer catalysts. Examples of such catalysts are

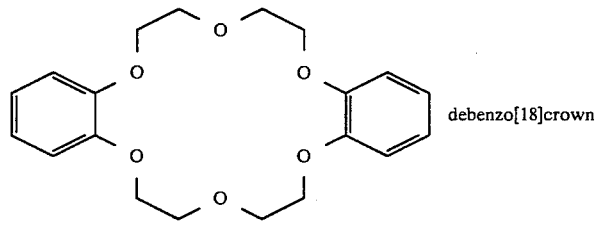

debenzo[18]crown-6

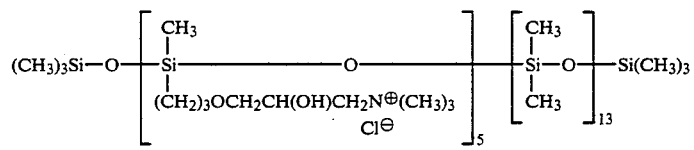

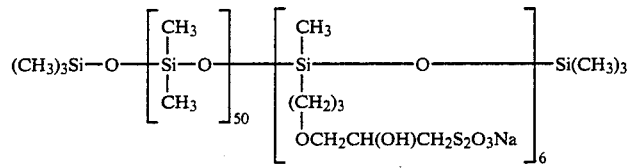

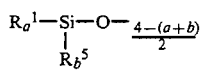

in which
R$^1$, a and b are defined as above and
R$^5$ represents the

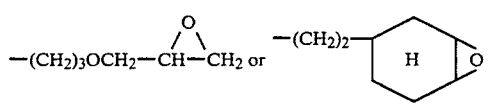

group, with half molar up to equimolar (relative to the epoxy groups) amounts of Me$_2$S$_2$O$_3$ in an aqueous medium, to which polar solvents are optionally added, acids being added during the reaction in amounts, such that the pH is maintained in the range of 5 to 9.

As polar organic solvents, lower aliphatic alcohols, such as, for example, ethanol or isopropanol are preferably used, 0.5 to 5 parts by volume of organic solvent being preferably used per part by volume of water. The reaction proceeds at room temperature or at moderately elevated temperatures, the rate of reaction decreasing with increasing molecular weight and increasing hydrophobicity of the polysiloxanes. The reaction is therefore, if possible, carried out at temperatures up to 100°

It is essential that the pH be maintained in the range of 5 to 9 during the reaction. This is accomplished by addition of an acid, especially by addition of dilute hydrochloric or acetic acid. Acid-splitting compounds or suitable ion exchangers with acidic groups may also be employed. By so doing, complete reaction of the thiosulfate with the epoxy groups of the polysiloxane is achieved. It is not permissible to add at the start the acid required for neutralizing the base released, since the Bunte salt formed would be decomposed by the acidic medium. Rather, it is important to maintain the pH in the required range of 5 to 9 during the reaction. This requires the controlled and constant addition of acid corresponding to the course of the following reaction:

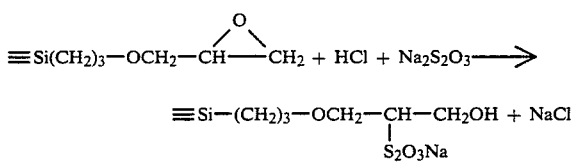

or

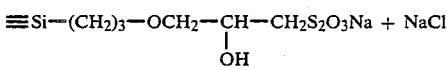

Depending on the molecular weight, degree of branching and content of Bunte salt groups, the inventive compounds synthesized according to the above-mentioned process, are liquid, pasty or solid substance.

The compounds are suitable for the surface treatment of inorganic or organic materials. They prove to be particularly suitable for treating textile materials, especially wool. It is a particular advantage of the inventive compounds that when applied on textile surfaces, they are crosslinked already at room temperature with film formation by the addition of sodium sulfide, so that a durable finish of the textile material is accomplished. Fibers, yarns, woven or knitted fabrics, fleeces and other materials can be treated. The inventive compounds are particularly suitable for shrinkproofing wool. For this purpose, the inventive compounds are applied in the form of a solution or a dispersion in water or water/alcohol mixtures on the fibers in amounts of 0.1 to 5%. The finishes obtained are resistant to organic solvents, such as those used, for example, in dry-cleaning. In contrast to conventional processes for finishing wool, the oxidative pretreatment of the fibers can be dispensed with in this process. This represents a clear advance, since the fibers can be damaged significantly by treatment with chlorine or peroxides.

In addition to the treatment of textiles, the inventive siloxanes with the Bunte salt groups can be used advantageously for the hydrophobizing finish of other solid materials, such as, paper, or slag wool. In these applications, a significant and special feature of the siloxanes with Bunte salt groups resides in that they can be readily crosslinked at room temperature by the addition of sulfides.

Gelling of siloxanes with Bunte salt groups takes place very easily after the addition of a suitable sulfide, as is shown by a gel, which is obtained from the inventive siloxane in aqueous solution after the addition of sodium sulfide and after 24 hours of reaction time at room temperature. This gel no longer contains any detectable Bunte salt groups; on the contrary, almost all of the original Bunte salt groups have reacted in pairs to form disulfide bridges.

A further advantage of the siloxanes with Bunte salt groups resides in that they dissolve in water and therefore, can be used from aqueous solution, provided that they contain a sufficiently large proportion of ionogenic groups.

Since the materials conventionally used for a hydrophobizing treatment are not soluble in water, they must be applied either from organic solvents or as emulsions. However, this results in problems which are associated either with the possible flammability or removal of the organic solvents or with the possible instability and sensitivity of emulsions. Of course, these difficulties do not occur when aqueous solutions of the inventive siloxanes are used.

Because the inventive siloxanes contain hydrophobic as well as hydrophilic groups, it is not surprising that they have a surfactant character. Siloxanes with Bunte salt groups therefore lower the surface tension of water. Due to the surface activity of these substances, the aqueous solutions are also distributed excellently on the solids to be treated.

Paper sprayed with a sodium sulfide solution and an aqueous solution of a siloxane with Bunte salt groups can be hydrophobized already at room temperature within a half hour. On the other hand, paper which has been sprayed with an appropriate emulsion of a hydrogen siloxane does not have a water repellent finish even after being kept for 24 hours at room temperature. Only after heating for several hours at 60° C., the paper is clearly hydrophobized by the hydrogen siloxane emulsion.

Like paper, slag wool can also be hydrophobized durably at room temperature by treatment with a siloxane with Bunte salt groups, if it is treated with an aqueous solution of an inventive siloxane, as well as with an aqueous sodium sulfide solution.

The following examples illustrate the invention.

EXAMPLE 1

$Na_2S_2O_3 \cdot 5H_2O$ (8.5 g, 34.5 mmoles) is dissolved in 14 ml of water together with 350 mg of the crown ether dibenzo[18]crown-6

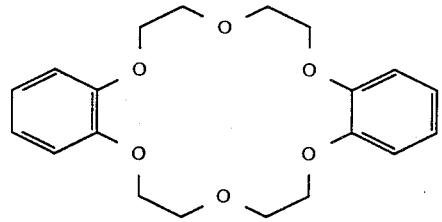

A 0.1% ethanolic phenolphthalein solution (0.3 ml) and 50 g (69 mequiv. of epoxy functions) of the epoxy functional siloxane of the following average formula

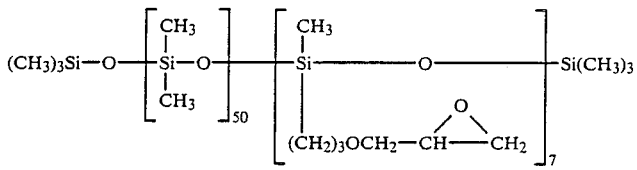

dissolved in 50 ml of ethanol, are added with vigorous stirring. The reaction mixture is heated so as to reflux. The pH rises during the reaction. In order to neutralize the mixture, 12.6 g of 10% solution of hydrochloric acid is added from a dropping funnel; the amount added is adjusted so that the reaction solution no longer turns red. After about 3 hours, the total amount of hydrochloric acid has been added. Heating under reflux is continued for a further half hour, during which time there is no further change in the pH. The solvents are removed under reduced pressure. The product contains 3.15% of sodium chloride, as well as the phase transfer catalyst. Free sodium thiosulfate can no longer be detected analytically in the reaction mixture. The following average formula is assigned to the product.

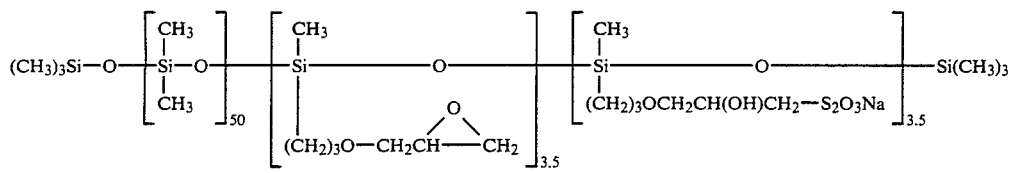

EXAMPLE 2

Na$_2$S$_2$O$_3$.5H$_2$O (26.5 g, 107 mmoles) together with 650 mg of the cationic siloxane of the following average formula

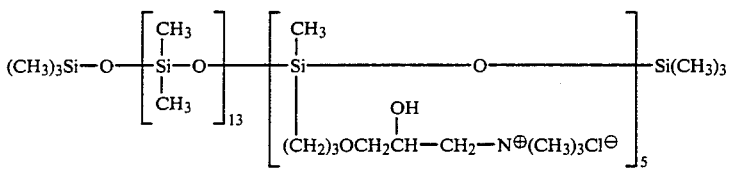

are dissolved in 42 ml of water. A 0.1% ethanolic phenolphthalein solution (0.5 ml) and 50 g (107 mequiv. of epoxy functions) of the epoxy functional siloxane of average formula

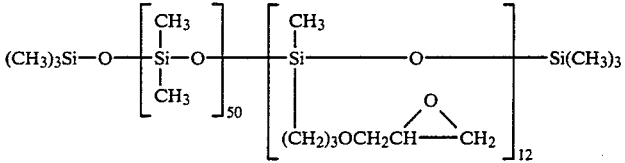

dissolved in 50 ml of isopropanol, are added with vigorous stirring. The reaction mixture is heated so as to reflux. The pH rises during the reaction. In order to neutralize the mixture, 6.42 g of acetic acid are added dropwise from a hypodermic syringe; the amount added is adjusted so that the solution no longer turns red. After about 3 hours, all of the acetic acid has been added. Heating under reflux is continued for a further half hour, during which time there is no further change in the pH. The solvents are removed under reduced pressure. The product contains 11.8% sodium acetate as well as the phase transfer catalyst. Free sodium thiosulfate can no longer be detected analytically in the reaction mixture. The product is assigned the following average formula:

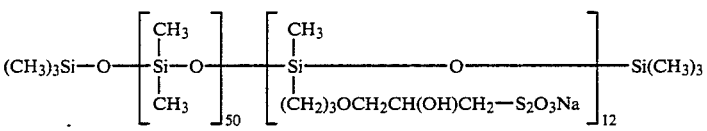

EXAMPLE 3

Na$_2$S$_2$O$_3$.5H$_2$O (26.5 g, 107 mmoles) together with 720 mg of the siloxane with Bunte salt groups, as prepared in Example 2, are dissolved in 42 ml of water. The epoxy functional siloxane (50 g, 107 mequiv. of epoxy functions) like that already used in Example 2, is dissolved in 50 ml isopropanol and added with vigorous stirring. The reaction mixture is heated so as to reflux. The change in the pH value of the reaction mixture is measured with an electrode. The pH is maintained between 7 and 8.5 by addition of a strongly acidic ion exchanger (Lewatit S 100). After a reaction time of 3 hours, there no longer is any change in the pH. After cooling, the ion exchanger is filtered off. The solvents are removed under reduced pressure. The reaction product still contains 3.4% of free S$_2$O$_3^{2-}$ ions, that is, 81.5% of the epoxy functions of the siloxane have been converted to Bunte salt groups. In calculating the elementary composition of the product, the sodium thiosulfate content was taken into consideration.

| Elementary Analysis | calculated | found |
|---|---|---|
| C | 29.8% | 29.4% |
| Na | 4.4% | 4.4% |
| S | 9.7% | 9.8% |
| Si | 23.4% | 23.0% |

The following average formula is assigned to the product:

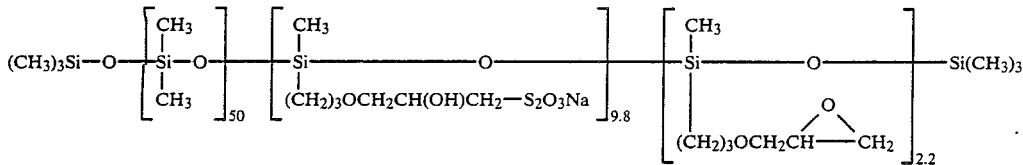

EXAMPLE 4

Na₂S₂O₃.5H₂O (67.75 g, 273 mmoles) is dissolved in 120 ml of water and mixed with 50 g of an epoxy functional siloxane, whose epoxide number is 8.7% (corresponding to 8.7 weight percent of epoxide oxygen) and which is dissolved in 190 ml of ethanol.

In addition, the siloxane contains 0.03% of Si-H hydrogen which has the following average formula

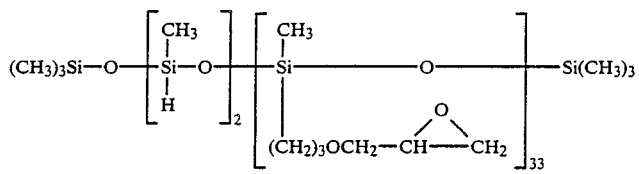

After 0.5 ml of a 0.1% ethanolic phenolphthalein solution have been added to it, the reaction mixture is heated under vigorous stirring so as to reflux. After an induction period of 30 minutes, the reaction commences as shown by a red coloration of the solution. During the following 150 minutes, 16.4 g of acetic acid are added dropwise so that the solution no longer turns red. After 2½ hours, the reaction is concluded, which can be recognized by the fact that the pH no longer changes. The intial two-phase system has changed over to a homogeneous solution. After cooling, the solvents are removed under reduced pressure. The product contains 20.4% sodium acetate. Free sodium thiosulfate can no longer be detected in the reaction mixture. The following average formula is assigned to the reaction product:

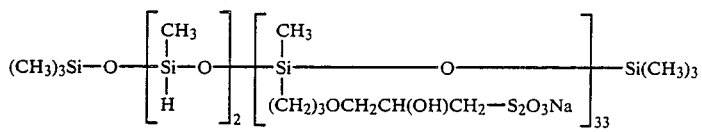

EXAMPLE 5

Na₂S₂O₃.5H₂O (9.78 g), 39.4 mmoles) is dissolved in 15 ml of water together with 300 mg of the cationic siloxane, similar to the one also used in Example 2. A 0.1% ethanolic phenolphthalein solution (0.2 ml) and 20 g (39.4 mequiv. of epoxy function) of the epoxy functional siloxane with the average formula of

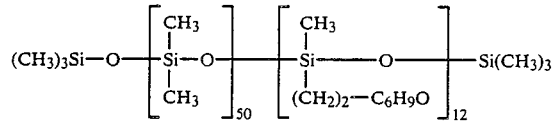

in which C₆H₉O represents the epoxicyclohexane radical and which is dissolved in 25 ml of isopropanol, are added with vigorous stirring. The reaction mixture is heated to reflux. In order to maintain the pH in the neutral region, 2.3 g of acetic acid are added dropwise during the reaction. The total reaction time is 36 hours. After cooling, the solvents are removed under reduced pressure. The product contains approximately 11% sodium acetate and still 0.9% thiosulfate ions. It follows from this that the conversion was 94%.

EXAMPLE 6

The siloxane with Bunte salt groups (10 g) similar to that synthesized in Example 2, is dissolved in 65 ml of water. Sodium sulfide, 1.23 g in 5 ml of water, is added to this solution at room temperature. After about 25 minutes, the formation of a gel can already be clearly observed. After the reaction mixture has stood for 24 hours, the polymeric solid formed is comminuted and extracted in a Soxhlet first with water and subsequently with methanol. After careful drying, the following elementary analysis is obtained.

C: 35.7%
Na: 0.05%
S: 5.9%
Si: 28.0%

The values found correspond to those which are expected for a polymer in which every two Bunte salt groups have reacted stoichiometrically and quantitatively with each other with formation of a disulfide bridge. For such a polymer, the elementary analysis is calculated to be C: 35.9%
Na: 0%
S: 6.0%
Si: 28.2%

EXAMPLE 7

Filter paper is hydrophobized by the application of an inventive siloxane with Bunte salt groups. For comparison, a second filter paper is treated with a hydrophobizing emulsion of the state of the art. In addition, an untreated filter paper is used for comparison.

(a) A circular sheet of filter paper (Schleicher and Schüll, Schwarzband) with a diameter of 11 cm is first sprayed all with 0.9 g of a 1% sodium sulfide solution and then with 0.9 g of a 1.33% solution of the siloxane with Bunte salt groups, as synthesized in Example 2. After being left for 30 minutes at room temperature, the filter paper is thoroughly washed with water and dried overnight at room temperature.

(b) A second filter paper is sprayed with 1.8 g of 1.1% emulsion of a hydrogen siloxane. The emulsion is obtained by diluting a 40% emulsion of a hydrogen siloxane having the average formula:

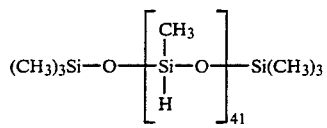

The filter is not washed, but only dried overnight.

(c) An untreated filter paper was used for comparison.

The three filter papers were covered with droplets of water, the following results being obtained:

(a) The filter paper is not wetted by the droplets of water. Even after 8 hours, no water has penetrated into the filter paper; the water droplets have become smaller only due to evaporation.

(b) The filter papers is not wetted initially by the water droplets; however, after a few minutes only, it can be seen that the water droplets are slowly absorbed. After one hour, all water droplets have penetrated into the filter paper.

(c) The water is absorbed immediately by the filter paper.

1 ml graduated pipettes filled with 0.5 ml of water are placed on each of the three filter papers. The water can escape from the pipette only by penetration into the filter paper. The time in which the contents of the pipettes fall from 0.5 to 0.1 ml is measured. The following results are obtained:

| | Time in Minutes to Empty From 0.5 to 0.1 ml | Comment: |
| --- | --- | --- |
| Filter paper (a) | >>420 | after 7 hours, the pipette had emptied from 0.5 to 0.35 ml |
| Filter paper (b) | 21 | |
| Filter paper (c) | 6.5 | |

EXAMPLE 8

Slag wool, such as that used in insulating mats for thermal and sound insulation and which consists of fibers with a diameter of 5 μm, and a length of 3 to 5 cm, is hydrophobized with siloxane having Bunte salt groups. For this purpose, the slag wool is first immersed in a 1% aqueous solution of the siloxane having Bunte salt groups whose synthesis is described in Example 2, drained off and gently squeezed dry, and subsequently dipped briefly into a 0.5% sodium sulfide solution and again drained. The slag wool is allowed to dry at room temperature.

Untreated slag wool and slag wool treated in the manner described are added to beakers filled with water. Whereas the untreated slag wool is immediately wetted by the water and submerges, the mineral wool treated with the siloxane having Bunte salt groups and then with sodium sulfide is not wetted. Even after a week, it still floats unchanged on the water.

EXAMPLE 9

A finely knitted fine wool material is impregnated with a liquor containing 1.4% of a polysiloxane having Bunte salt groups prepared according to Example 2, cured by treating it with a 0.3% solution of $Na_2S \cdot 9H_2O$ and dried in a tumbler at 45° C. The treated, fine-wool material has a soft, full hand. In the cubex test carried out according to the test method of the IWS, the finished material has a distinctly lower tendency to shrink and a significantly better pilling behavior than an untreated sample. The following results are obtained.

| | Two-Dimensional Felting Shrinkage | Appearance of Material |
| --- | --- | --- |
| Untreated material | 52% | highly pilled |
| Material treated according to the present invention | 11% | almost unchanged |

We claim:

1. Organopolysiloxanes with Bunte salt groups attached having the formula:

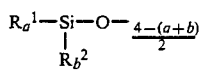

the Bunte salt groups being linked to a silicon atom by a carbon atom wherein $R^1$ is methyl with the proviso that up to 10% of the $R^1$ groups may be alkyl with up to 18 carbon atoms, vinyl phenyl, hydrogen or hydroxyl, $R^2$ is

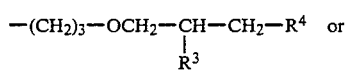

or

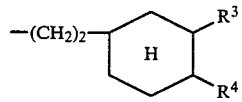

in which one of the $R^3$ and $R^4$ is OH and the other —$S_2O_3$Me wherein Me is alkali, ammonium, or substituted ammonium, providing that in an amount up to 50% of the $R^2$ groups, $R^3$ and $R^4$ taken together can be OH or the oxygen atom of an oxirane ring, a is from 1 to 2.33 and b is from 0.02 to 1.

2. The compound of claim 1 wherein Me is substituted ammonium selected from the group consisting of tetrabutylammonium, tetramethylammonium, and didecyl dimethylammonium.

3. The compound of claim 1 selected from the group consisting of

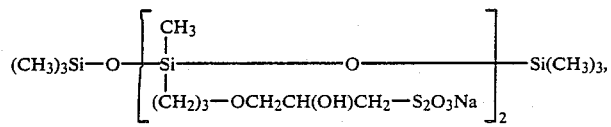
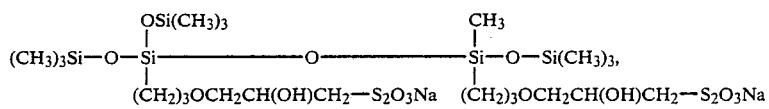
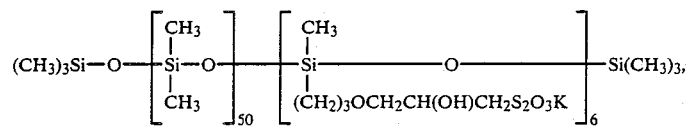
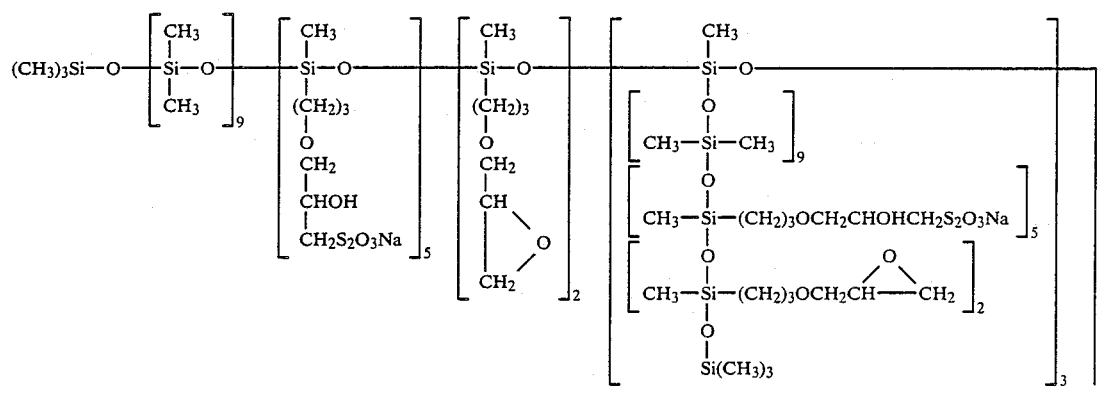
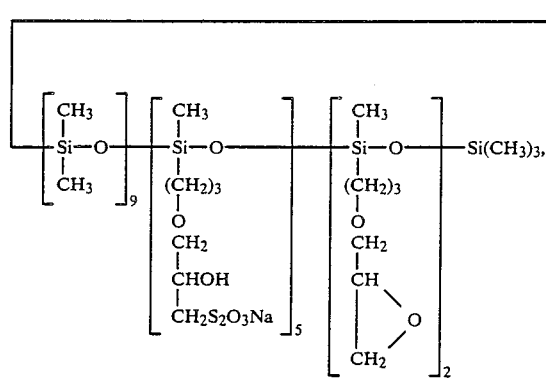
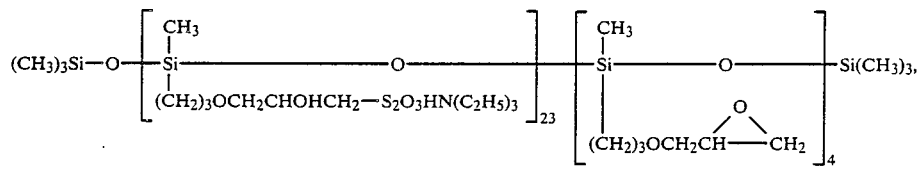
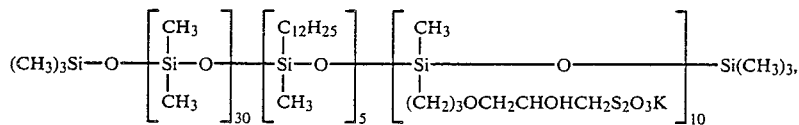
and -continued

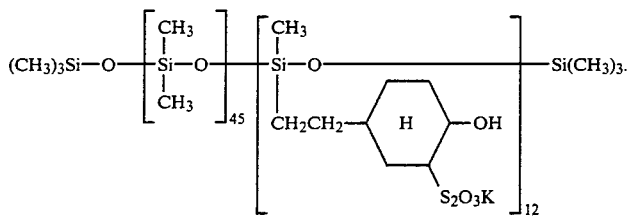

4. A process for the synthesis of organopolysiloxanes as defined in claim 1 wherein organopolysiloxanes containing epoxy groups and having the formula

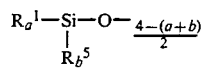

in which
R$^1$, a and b are defined as above and
R$^5$ represents the

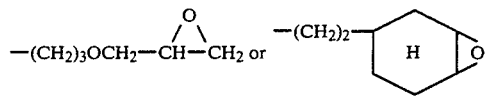

group, are reacted at temperatures up to 100° C. with half molar to equimolar, relative to the epoxy groups, amounts of Me$_2$S$_2$O$_3$ in an aqueous medium, with acids being added during the reaction in amounts, such that the pH is maintained in the range of 5 to 9.

5. The process of claim 4 wherein polar organic solvents are added to the aqueous medium.

6. The process of claim 4 wherein the reaction is carried out in the presence of phase transfer catalysts.

7. The process of claim 5 wherein the reaction is carried out in the presence of phase transfer catalysts.

8. The process of claim 5 or 6 wherein the polar organic solvent is a lower aliphatic alcohol.

9. The process of claim 8 wherein the amount of solvent is from 0.5 to 5 parts by volume of solvent per part by volume of water.

10. The process of claim 5 wherein the pH is maintained in the required range by the addition of dilute hydrochloric or acetic acid.

11. The process of claim 4 wherein the product is an organopolysiloxane selected from the group consisting of

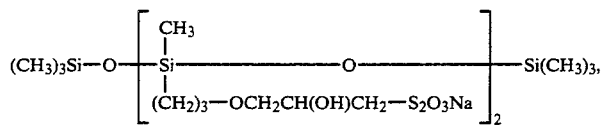

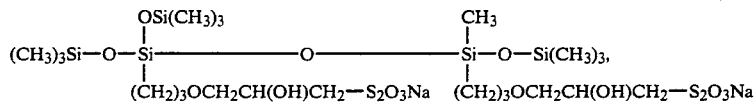

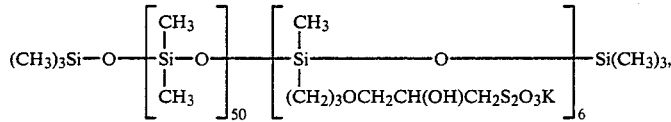

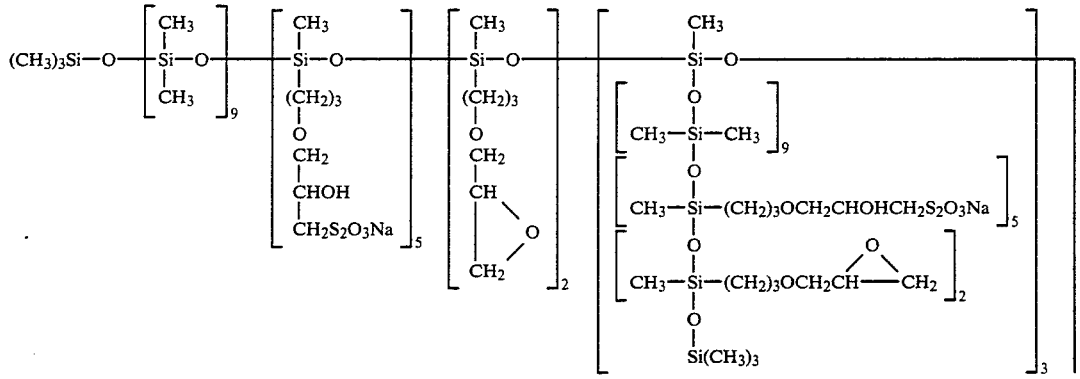

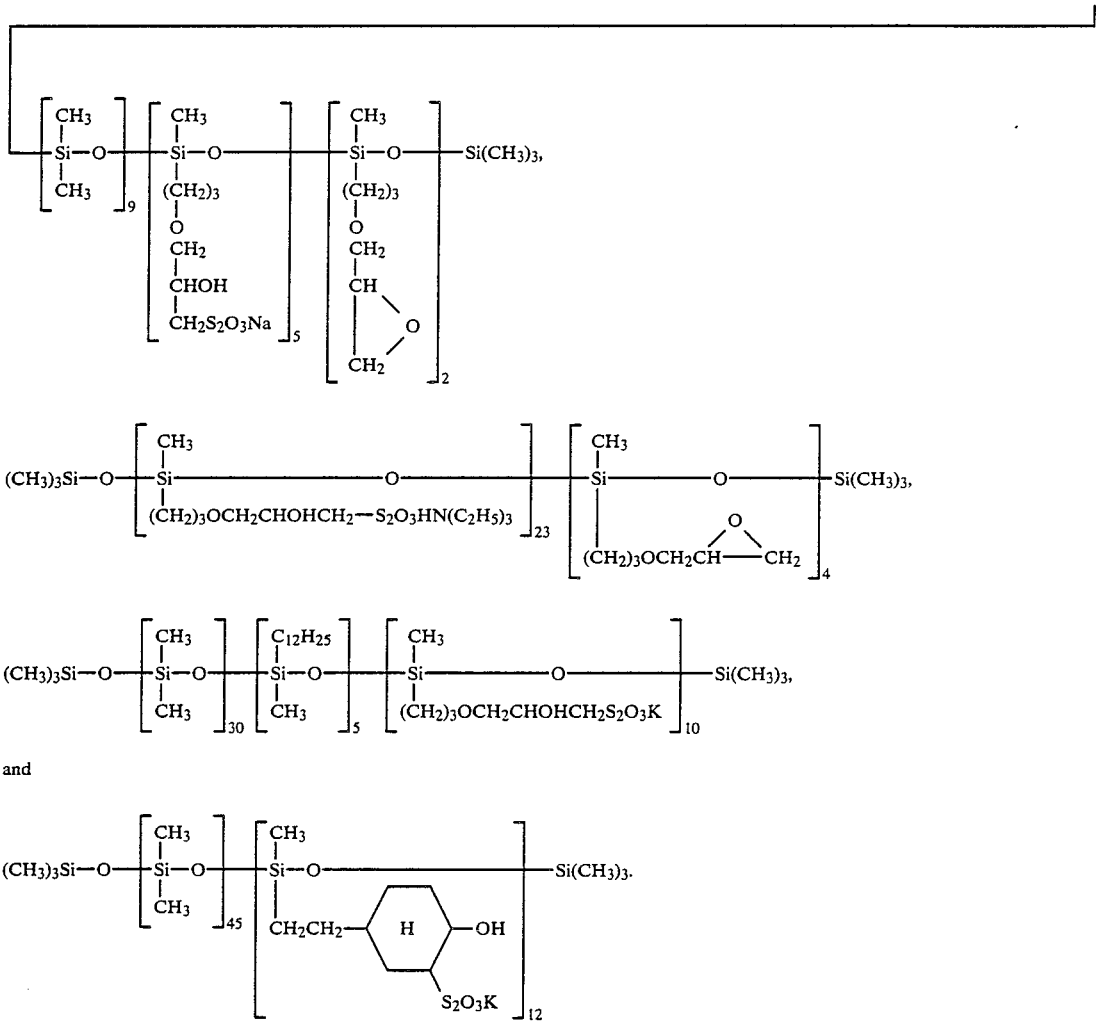

12. A method for treating textiles to influence their surface properties comprising contacting the textile with an effective amount of the compound of claim 1.

13. The method of claim 11 wherein the property influenced is the lubricity, hand, or shrinkage of the textile.

14. A method for hydrophobizing a material comprising contacting the material with a hydropobizing amount of the compound of claim 1.

15. The method of claim 14 wherein the material is paper or slag wool.

* * * * *